US008123229B2

(12) United States Patent
Eguchi

(10) Patent No.: US 8,123,229 B2
(45) Date of Patent: Feb. 28, 2012

(54) LIP TYPE SEAL

(75) Inventor: Nobuyuki Eguchi, Fukushima (JP)

(73) Assignee: NOK Corporation (JP)

( * ) Notice: Subject to any disclaimer, the term of this patent is extended or adjusted under 35 U.S.C. 154(b) by 530 days.

(21) Appl. No.: 12/086,135

(22) PCT Filed: Nov. 21, 2006

(86) PCT No.: PCT/JP2006/323143
§ 371 (c)(1),
(2), (4) Date: Jun. 6, 2008

(87) PCT Pub. No.: WO2007/066503
PCT Pub. Date: Jun. 14, 2007

(65) Prior Publication Data
US 2009/0267306 A1  Oct. 29, 2009

(30) Foreign Application Priority Data
Dec. 8, 2005 (JP) .................................. 2005-354193

(51) Int. Cl.
*F16J 15/24* (2006.01)
(52) U.S. Cl. ..................... 277/558; 277/562; 277/572
(58) Field of Classification Search ............. 277/549, 277/551, 553, 558, 560, 562, 568, 572
See application file for complete search history.

(56) References Cited

U.S. PATENT DOCUMENTS

| | | | | |
|---|---|---|---|---|
| 2,907,596 | A * | 10/1959 | Maha | 277/566 |
| 3,215,441 | A * | 11/1965 | Horvereid | 277/437 |
| 3,608,913 | A * | 9/1971 | D'Assignies | 277/556 |
| 4,537,422 | A * | 8/1985 | O'Rourke | 280/124.129 |
| 4,592,558 | A * | 6/1986 | Hopkins | 277/572 |
| 4,893,823 | A * | 1/1990 | Strouse et al. | 277/437 |
| 5,165,700 | A * | 11/1992 | Stoll et al. | 277/550 |
| 5,306,021 | A * | 4/1994 | Morvant | 277/584 |
| 5,567,134 | A | 10/1996 | Inoue et al. | |
| 5,979,904 | A * | 11/1999 | Balsells | 277/554 |
| 6,003,848 | A * | 12/1999 | Cotter et al. | 267/64.11 |
| 6,267,383 | B1 * | 7/2001 | Morvant | 277/439 |

(Continued)

FOREIGN PATENT DOCUMENTS

DE  195 22 306 A1  1/1996

(Continued)

OTHER PUBLICATIONS

International Search Report (in English) and Written Opinion of the International Searching Authority (in Japanese) for PCT/JP2006/323143, mailed Dec. 19, 2006; ISA/JP.

*Primary Examiner* — Gilbert Lee
(74) *Attorney, Agent, or Firm* — Harness, Dickey & Pierce, P.L.C.

(57) ABSTRACT

A resin lip type seal has first and second inner peripheral seal lips and an outer peripheral seal lip slidably contacting an operation member and a fixed member. The second inner peripheral seal lip is formed in a plate-shape to extend obliquely in an inner peripheral direction toward a second sealed fluid side so that an inner peripheral side end portion slidably contacts with a shaft and an outer peripheral side end portion contacts with a tapered surface formed on a housing or an installation member of the housing, whereby contact surface pressure in the inner peripheral direction acts on the inner peripheral side end portion.

6 Claims, 3 Drawing Sheets

U.S. PATENT DOCUMENTS

| | | | |
|---|---|---|---|
| 7,134,671 B2 * | 11/2006 | Duke et al. | 277/560 |
| 2004/0119244 A1 * | 6/2004 | Duke et al. | 277/549 |

FOREIGN PATENT DOCUMENTS

| GB | 2 290 585 A | 1/1996 |
|---|---|---|
| JP | 57-134454 | 8/1982 |
| JP | 60-14356 | 1/1985 |
| JP | 08-35563 A | 2/1996 |
| JP | 08-68370 A | 3/1996 |
| JP | 2005-147317 A | 6/2005 |
| JP | 2005-299808 A | 10/2005 |
| WO | WO-2005/100794 A1 | 10/2005 |

* cited by examiner

LIP TYPE SEAL

CROSS-REFERENCE TO RELATED APPLICATIONS

This is a national phase of the International Application No. PCT/JP2006/323143 filed Nov. 21, 2006 and published in the Japanese language.

BACKGROUND OF THE INVENTION

1. Field of the Invention

The present invention relates to a lip type seal which is used as a seal for a reciprocating part of a fuel pump in a fuel injection pump for a gasoline direct injection type engine and is used in the other general oil, pneumatic and hydraulic pressure devices.

2. Description of the Conventional Art

The gasoline direct injection type engine is structured such as to directly inject fuel having a high pressure into a cylinder so as to burn for the purpose of regulating exhaust gas and improving fuel consumption in recent years, and in accordance with higher performance of a fuel injection pump used for directly injecting fuel having the high pressure, there is a tendency that the environment near a seal used in the fuel injection pump becomes more and more severe.

Conventionally, as a seal used in the fuel injection pump, there has been known an oil seal made of a rubber-like elastic material and integrally provided with a first seal lip to seal a high-pressure gasoline or the like, which is a first sealed fluid, at a first sealed fluid side, and a second seal lip to seal an oil for cooling and lubrication existing at a second sealed fluid side opposite in an axial direction to the first sealed fluid side (refer to Japanese Unexamined Patent Publication No. 8-68370). However, since the material is constituted by the rubber-like elastic material, a pressure resistance is short due to the high pressure of the first sealed fluid, and a chemical resistance against an inferior fuel is poor, so that there is a risk that the seal function thereof can not be sufficiently satisfied. Accordingly, a lip type seal using resin such as PTFE or the like which is excellent in the pressure resistance and the chemical resistance has been widely used.

A conventional lip type seal 101 is provided with a seal main body 107 having an approximately cylindrical concave portion 102 which is open to a first sealed fluid side A, a first inner peripheral seal lip 103 and a first outer peripheral seal lip 104 which are provided in inner and outer peripheries of the cylindrical concave portion 102 and slidably contact with a shaft and a housing, an approximately wedge-shaped concave portion 105 which is open so as to face to the shaft at a second sealed fluid side B, and a plate-shaped second inner peripheral seal lip 106 formed at a second sealed fluid side B of the wedge-shaped concave portion 105, and being integrally formed by resin, and an elastic body 111 inward installed in the cylindrical concave portion 102, as shown in FIG. 3. The second inner peripheral seal lip 106 is greatly bent around a point of a bottom end point M of the wedge-shaped concave portion 105 in a direction of an arrow Y as shown by a one-dot chain line at a time of inserting the shaft 108 to the inner peripheral side from the first sealed fluid side A toward the second sealed fluid side B (in a direction of a thick arrow X), as shown in FIG. 4, and fastening is secured by reaction force to restore its original state. However, since the seal main body 107 is formed by resin, the second inner peripheral seal lip 106 has a problem that its seal performance is lowered by reduction in the fastening caused by a creep. Further, since the second inner peripheral seal lip 106 is bent around point M so as to seal on the basis of its reaction force, there is a risk that stress is concentrated on the point M and durability is lowered. Further, since the second inner peripheral seal lip 106 is greatly bent, settlement of the seal main body 107 is not stabilized at a time of being installed to an annular gap. Therefore, it is necessary to form an outer peripheral collar portion 109 on the seal main body 107 and there is a problem that a manufacturing cost becomes high.

SUMMARY OF THE INVENTION

Problem to be Solved by the Invention

The present invention is made for solving the problem mentioned above, and an object of the present invention is to provide a resin lip type seal having an approximately cylindrical concave portion which is open so as to face to a first sealed fluid side, a first inner peripheral seal lip and a first outer peripheral seal lip which slidably contact with an operation member and a fixed member provided at inner and outer peripheries of the concave portion, and a second inner peripheral seal lip which is provided at a second sealed fluid side, the seal lips being integrally formed, wherein the second inner peripheral seal lip is not forcibly bent, and reduction in fastening caused by a creep of the second inner peripheral seal lip can be compensated, whereby a sealing performance can be prevented from being lowered.

Means for Solving the Problem

In order to achieve the object mentioned above, in accordance with an aspect of the present invention, there is provided a lip type seal comprising:

a resin seal main body being installed in an annular gap between an operation member and a fixed member, having an approximately cylindrical concave portion which is open so as to face to a first sealed fluid side, and being integrally provided with a first inner peripheral seal lip and a first outer peripheral seal lip which are provided at inner and outer peripheries of the cylindrical concave portion and slidably contact with the operation member and the fixed member, and a plate-shaped second inner peripheral seal lip which is positioned at a second sealed fluid side opposite in an axial direction to the first sealed fluid side and extends diagonally in an inner peripheral direction toward the second sealed fluid side; and an elastic body inward installed to the cylindrical concave portion, wherein an outer peripheral side end portion of the second inner peripheral seal lip is brought into contact with a taper surface formed in the fixed member or an installation member which is fitted to the fixed member at a time when pressure is applied from the first sealed fluid side, and contact surface pressure in an inner peripheral direction is applied to an inner peripheral side end portion of the second inner peripheral seal lip which slidably contacts with the operation member.

Effect of the Invention

The present invention achieves the following effects.

In the lip type seal in accordance with the present invention provided with the structure mentioned above, since the second inner peripheral seal lip extends diagonally in the inner peripheral direction toward the second sealed fluid side so as to slidably contact with the operation member, and is not greatly bent to the second sealed fluid side, there is no place on which stress is concentrated, and it is possible to improve a durability of the lip type seal.

Further, since the outer peripheral side end portion of the second inner peripheral seal lip is brought into contact with the taper surface formed in the fixed member or the installation member fitted to the fixed member, at a time when the pressure is applied from the first sealed fluid side, and reaction force acts as contact surface pressure in the inner peripheral direction on the inner peripheral side end portion which slidably contacts with the operation member, it is possible to secure the contact surface pressure even in the case that fastening is lowered due to a creep of the second inner peripheral seal lip, and it is possible to secure a stable sealing performance.

Further, since the second inner peripheral seal lip is not bent at a time of installing the lip type seal in the annular gaps, settlement of the seal main body to the annular gap is improved, it is not necessary to form an outer peripheral collar portion on the seal main body, and it is possible to reduce a manufacturing cost.

DETAILED DESCRIPTION OF PREFERRED EMBODIMENT

A description will be given below of preferable embodiments in accordance with the present invention with reference to the accompanying drawings.

First Embodiment

Figure 1:
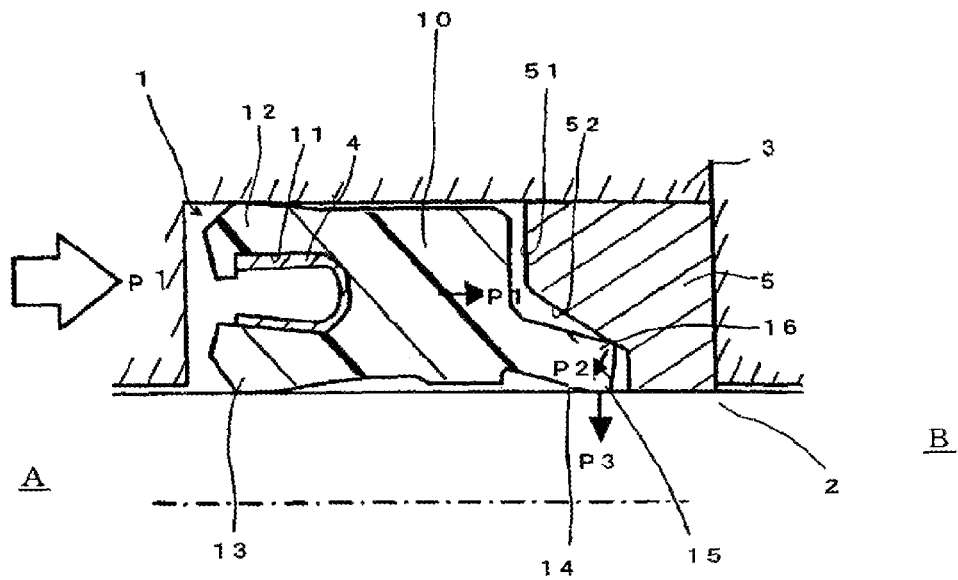
FIG. 1 is a cross sectional view of a lip type seal in accordance with a first embodiment of the present invention.

FIG. 1 is a cross sectional view showing a state in which a lip type seal 1 in accordance with a first embodiment of the present invention is installed in an annular space formed by a shaft 2 corresponding to the operation member which reciprocates within a high-pressure fuel injection pump and a housing 3 corresponding to the fixed member.

The lip type seal 1 is used in a fuel injection pump for a gasoline direct injection type engine, and has a function of sealing high-pressure fuel such as a gasoline or the like existing at a first sealed fluid side A, and a function of sealing oil for the purpose of cooling and lubrication existing at a second sealed fluid side B.

In FIG. 1, the lip type seal 1 is provided with a seal main body 10, and an elastic body 4 inward installed to a concave portion 11 formed in the seal main body 10.

The seal main body 10 is formed by resin such as PTFE, has an approximately cylindrical concave portion 11 which is open so as to face to the first sealed fluid side A, is provided with a first outer peripheral seal lip 12 having an approximately triangular cross sectional shape and slidably contacting with the housing 3 at an outer peripheral side of the concave portion 11, and is provided with a first inner peripheral seal lip 13 having an approximately triangular cross sectional shape and slidably contacting with the shaft 2 at an inner peripheral side thereof in accordance with integral molding.

At the second sealed fluid side B opposite in the axial direction to the first sealed fluid side A, there is provided a second inner peripheral seal lip 14, which is formed to have a plate-shaped cross section, extends diagonally in an inner peripheral direction toward the second sealed fluid side A and has an inner peripheral side end portion 15 slidably contacting with the shaft 2, in accordance with integral molding with the seal main body 10. Further, an outer peripheral side end portion 16 of the second inner peripheral seal lip 14 is structured such as to be brought into contact with a taper surface 52 which is formed in a first sealed fluid side end surface 51 of an installation member 5 mentioned below.

The elastic body 4 is constituted by a metal spring having an approximately U-shaped cross section, is inward installed to a concave portion 11 which is open so as to face to the first sealed fluid side A of the seal main body 10, and applies contact surface pressure in a radial direction to the first outer peripheral seal lip 12 and the first inner peripheral seal lip 13.

The installation member 5 is fitted to an inner peripheral side of the housing 3 so as to be positioned at the second sealed fluid side B of the lip type seal 1, and a taper surface 52 extending diagonally in the inner peripheral direction toward the second sealed fluid side is formed in the first sealed fluid side end surface 51 of the installation member 5.

Accordingly, since the second inner peripheral seal lip 14 is not bent even when the shaft 2 is inserted from the first sealed fluid side A after installation of the lip type seal 1 having the structure mentioned above to the housing 3, a place on which stress is concentrated is not generated, and it is possible to improve durability of the lip type seal 1.

Further, when a pressure P1 is applied from the first sealed fluid side A, the outer peripheral side end portion 15 of the second inner peripheral seal lip 14 is brought into contact with the taper surface 52 of the installation member 5, and pressure P2 caused by a reaction thereof is applied as contact surface pressure P3 in the inner peripheral direction to the inner peripheral side end portion 15 slidably contacting with the shaft 2. Accordingly, it is possible to secure contact surface pressure even if fastening of the second inner peripheral seal lip 14 is lowered by deterioration of a creep characteristic peculiar to resin.

Further, since the second inner peripheral seal lip 14 is not bent, settlement of the seal main body 10 is improved at a time of installing the lip type seal 1 in the annular gap, it becomes unnecessary to form an outer peripheral collar portion on the seal main body 10, and it is possible to reduce a manufacturing cost.

Second Embodiment

Figure 2:
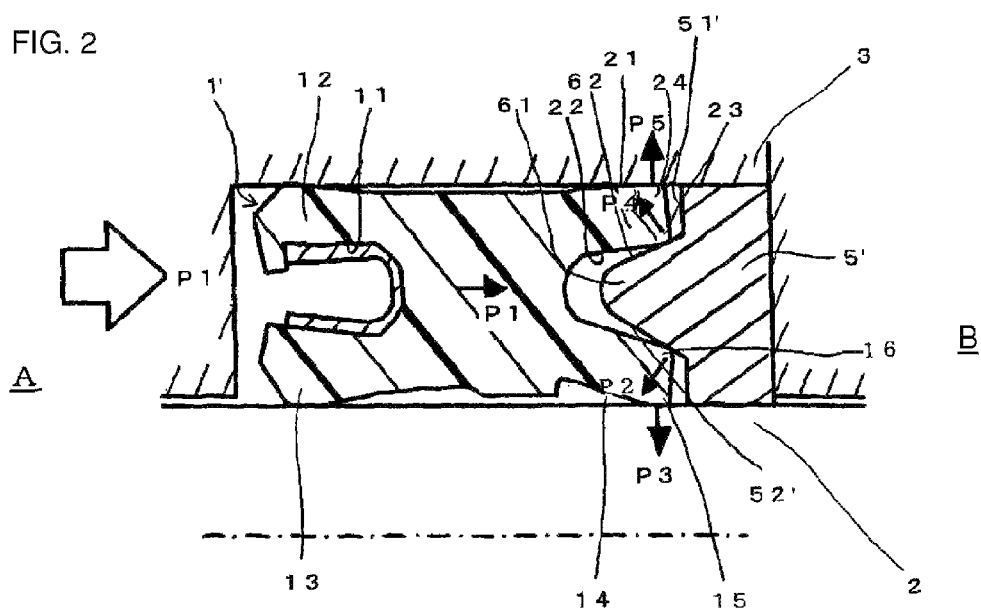
FIG. 2 is a cross sectional view of a lip type seal in accordance with a second embodiment of the present invention.
Figure 3:
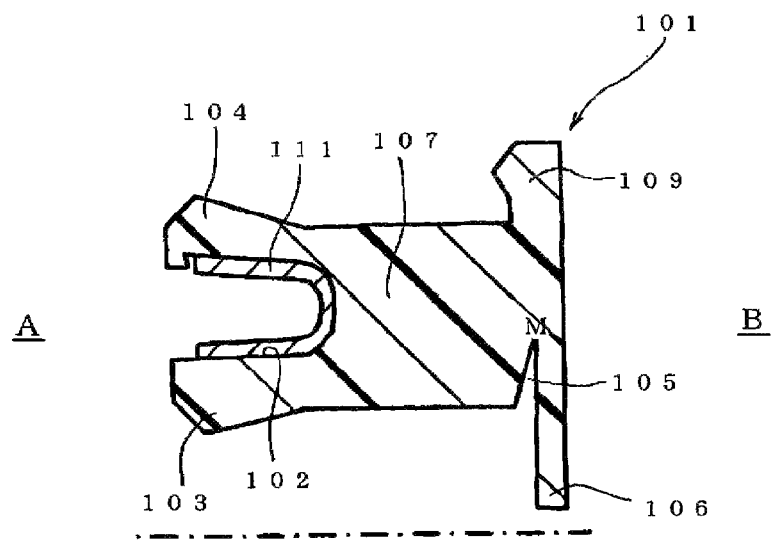
FIG. 3 is a cross sectional view of a lip type seal in accordance with a prior art.
Figure 4:
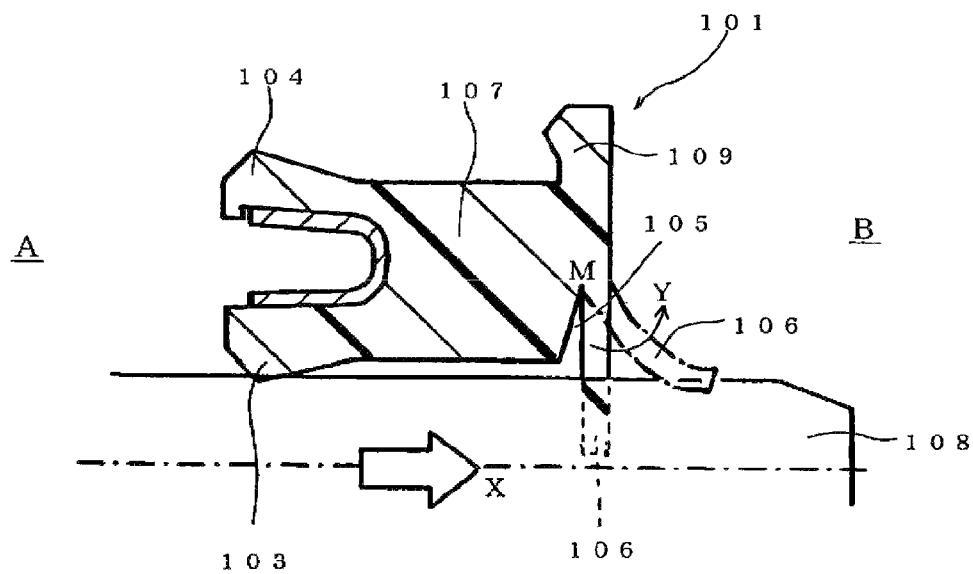
FIG. 4 is an explanatory view of an installed state of the lip type seal in accordance with the prior art.

FIG. 2 is a cross sectional view of a main portion of a lip type seal 1' in accordance with a second embodiment of the present invention.

The lip type seal 1' in FIG. 2 corresponds to a case that a second outer peripheral seal lip 21 is further provided at an outer peripheral side of a second inner peripheral seal lip 14 provided at the second sealed fluid side B, as is different from the first embodiment. In other words, the second embodiment further has an approximately cylindrical second concave portion 22 which is open so as to face to the second sealed fluid side B, in addition to the concave portion 11 which is open so as to face to the first sealed fluid side A, is provided with the plate-shaped second inner peripheral seal lip 14 slidably contacting with the shaft 2 at an inner peripheral side of the second concave portion 22, and is further provided with a plate-shaped second outer peripheral seal lip 21 in which a second inner peripheral side end portion 23 is brought into contact with a second taper surface 62 mentioned below and a second outer peripheral side end portion 24 slidably contacts with the housing 3.

Further, a convex portion 61 is formed in a first sealed fluid surface side end surface 51' of the installation member 5' fitted to the housing 3, and a second taper surface 62 with which the second outer peripheral seal lip 21 is brought into contact at an outer peripheral side and the taper surface 52' with which the second inner peripheral seal lip 14 is brought into contact are formed in inner and outer peripheral sides of the convex portion 61.

Accordingly, when pressure P1 is applied to the lip type seal 1' installed in the annular gap between the housing 3 and the shaft 2 from the first sealed fluid side A, the outer peripheral side end portion 16 of the second inner peripheral seal lip 14 is brought into contact with the taper surface 52' of the installation member 5', pressure P2 caused by a reaction thereof is applied as contact surface pressure P3 in the inner peripheral direction to the inner peripheral side end portion 15 slidably contacting with the shaft 2, the second inner peripheral side end portion 23 of the second outer peripheral seal lip 21 is brought into contact with the second taper surface 62 of the installation member 5', and pressure P4 caused by a reaction thereof is applied as contact surface pressure P5 in the outer peripheral direction to the second outer peripheral side end portion 24 slidably contacting with the housing 3. Accordingly, even if fastening of the second inner peripheral seal lip 14 and the second outer peripheral seal lip 21 is lowered due to deterioration of a creep characteristic peculiar to resin, it is possible to secure the contact surface pressure.

Figure 5:
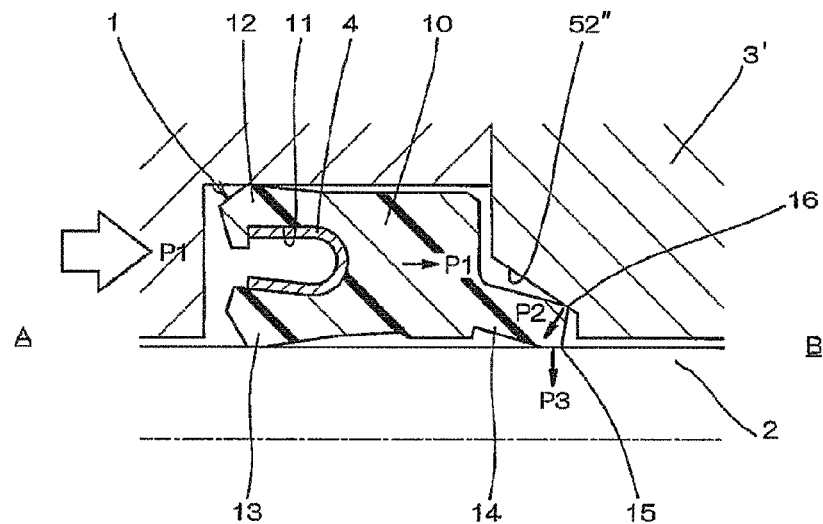
FIG. 5 is a cross sectional view of a lip type seal in accordance with a third embodiment of the present invention.
Figure 6:
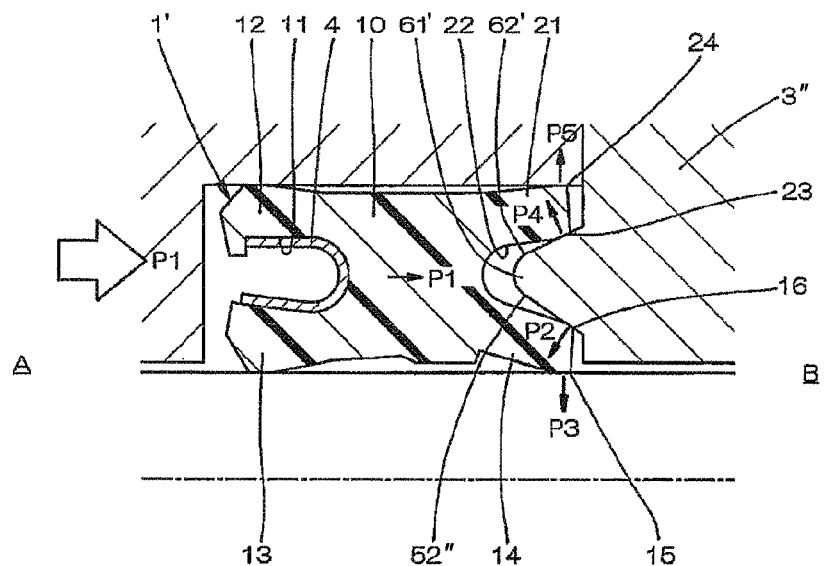
FIG. 6 is a cross sectional view of a lip type seal in accordance with a fourth embodiment of the present invention.

In the present embodiment, the description is given of the case that the taper surfaces (52', 62) are formed in the installation member 5' fitted to the housing 3, however, the present invention may be applied to a case that the taper surfaces (52, 52', 62) are formed in the housing 3 without the installation member 5, 5' being fitted. For example, please see FIG. 5 which is a cross sectional view of a lip type seal in accordance with a third embodiment of the present invention omitting the installation member. Please also see FIG. 6 which is a cross sectional view of a lip type seal in accordance with a fourth embodiment of the present invention also omitting the installation member. Elements in FIGS. 5 and 6 that are the same as in previous embodiments are indicated with like reference numerals. Similar elements are delineated with primed designations.

What is claimed is:

1. A sealing device comprising:
    a monolithic resin seal main body installed in an annular gap between an operation member and a fixed member, said resin seal main body including:
        an approximately cylindrical concave portion which is open to face to a first sealed fluid side;
        a first inner peripheral seal lip and a first outer peripheral seal lip which are integrally provided at inner and outer peripheries of said cylindrical concave portion and slidably contact with said operation member and said fixed member, respectively; and
        a plate-shaped second inner peripheral seal lip which is positioned at a second sealed fluid side opposite in an axial direction to the first sealed fluid side and extends diagonally in an inner peripheral direction toward the second sealed fluid side, an inner peripheral side end portion of said second inner peripheral seal lip slidably contacting with said operation member;
    an elastic body installed to said cylindrical concave portion of the resin seal main body; and
    a tapered surface extending diagonally relative to said fixed member,
    wherein said second inner peripheral seal lip and said tapered surface are configured such that an outer peripheral side end portion of said second inner peripheral seal lip directly contacts said tapered surface at a time when a pressure is applied from the first sealed fluid side, and resultant contact surface pressure in the inner peripheral direction is applied to the inner peripheral side end portion of said second inner peripheral seal lip.

2. The sealing device of claim 1 further comprising:
    an installation member fitted to the fixed member, said installation member including said tapered surface.

3. The sealing device of claim 1 wherein said tapered surface is a surface of said fixed member.

4. A sealing device comprising:
    a monolithic resin seal main body installed in an annular gap between an operation member and a fixed member, said resin seal main body including:
        an approximately cylindrical concave portion which is open to face to a first sealed fluid side;
        a first inner peripheral seal lip and a first outer peripheral seal lip which are integrally provided at inner and outer peripheries of said cylindrical concave portion and slidably contact with said operation member and said fixed member, respectively; and
        a plate-shaped second inner peripheral seal lip and a plate shaped second outer peripheral seal lip which are positioned at a second sealed fluid side opposite in an axial direction to the first sealed fluid side and extend diagonally in inner and outer peripheral directions, respectively, toward the second sealed fluid side, an inner peripheral side end portion of said second inner peripheral seal lip slidably contacting with said operation member, an outer peripheral side end portion of said second outer peripheral seal lip slidably contacting with said fixed member;
    an elastic body installed to said cylindrical concave portion of the resin seal main body; and
    first and second tapered surfaces extending diagonally relative to said fixed member,
    wherein said second inner and outer peripheral seal lips and said first and second tapered surfaces are configured such that an outer peripheral side end portion of said second inner peripheral seal lip and an inner peripheral side end portion of said second outer peripheral seal lip directly contact said first and second tapered surfaces, respectively, at a time when a pressure is applied from the first sealed fluid side, and resultant contact surface pressure in the inner and outer peripheral directions is applied to the inner and outer peripheral side end portions of said second inner and outer peripheral seal lips, respectively.

5. The sealing device of claim 4 further comprising:
    an installation member fitted to the fixed member, said installation member including said first and second tapered surfaces.

6. The sealing device of claim 4 wherein said first and second tapered surfaces are surfaces of said fixed member.

* * * * *